(12) United States Patent
Eriksson (10) Patent No.: US 8,646,412 B2
(45) Date of Patent: Feb. 11, 2014

(54) ARRANGEMENT FOR AUTOMATICALLY CLEANING TEAT CUPS OF A ROTARY MILKING PLATFORM

(75) Inventor: Jan Eriksson, Uttran (SE)

(73) Assignee: DeLaval Holding AB, Tumba (SE)

( * ) Notice: Subject to any disclaimer, the term of this patent is extended or adjusted under 35 U.S.C. 154(b) by 183 days.

(21) Appl. No.: 13/258,614

(22) PCT Filed: Mar. 26, 2010

(86) PCT No.: PCT/EP2010/054005
§ 371 (c)(1),
(2), (4) Date: Sep. 22, 2011

(87) PCT Pub. No.: WO2010/115731
PCT Pub. Date: Oct. 14, 2010

(65) Prior Publication Data
US 2012/0012060 A1 Jan. 19, 2012

(30) Foreign Application Priority Data

Apr. 1, 2009 (SE) ...................................... 0950204

(51) Int. Cl.
*A01J 7/02* (2006.01)
(52) U.S. Cl.
USPC ..................................... 119/14.18; 119/14.04
(58) Field of Classification Search
USPC .......... 119/14.18, 14.01, 14.02, 14.03, 14.04, 119/14.08
See application file for complete search history.

(56) References Cited

U.S. PATENT DOCUMENTS

| 4,145,992 | A | | 3/1979 | Rafaely | |
|---|---|---|---|---|---|
| 4,508,058 | A | * | 4/1985 | Jakobson et al. | 119/14.02 |
| 5,195,455 | A | * | 3/1993 | van der Lely et al. | 119/14.03 |
| 5,865,138 | A | * | 2/1999 | van der Lely | 119/14.02 |
| 6,050,219 | A | * | 4/2000 | van der Lely | 119/14.08 |
| 6,401,654 | B1 | * | 6/2002 | Hallsten et al. | 119/14.18 |
| 6,443,094 | B1 | * | 9/2002 | DeWaard | 119/14.18 |
| 6,626,130 | B1 | * | 9/2003 | Eriksson | 119/670 |

(Continued)

FOREIGN PATENT DOCUMENTS

| DE | 43 39 131 A1 | 5/1995 |
|---|---|---|
| DE | 44 26 031 C1 | 8/1995 |

(Continued)

OTHER PUBLICATIONS

International-Type Search Report, dated Sep. 24, 2009, from corresponding PCT application.

(Continued)

*Primary Examiner* — T. Nguyen
(74) *Attorney, Agent, or Firm* — Young & Thompson (57) ABSTRACT

An arrangement for automatically cleaning teat cups of a rotary milking platform includes i) a cleaning device at the side of the platform, the cleaning device having a movable part provided with an outlet opening through which a cleaning fluid is supplied to the teat cups; and ii) a positioning unit arranged to provide positioning of the cleaning device to a cleaning position in which the cleaning device is able to supply the cleaning medium from the outlet opening to the teat cups, the positioning unit adapted to provide a positioning of the movable part of the cleaning device in relation to the teat cups from an inactive position on the side of the platform to an active position in which the movable part extends in over the platform towards the teat cups to the cleaning position.

20 Claims, 6 Drawing Sheets

(56) References Cited

U.S. PATENT DOCUMENTS

| | | | |
|---|---|---|---|
| 8,205,573 B2 * | 6/2012 | Eriksson et al. | 119/14.02 |
| 8,342,124 B2 * | 1/2013 | Axelsson | 119/14.02 |
| 2005/0211173 A1 * | 9/2005 | Fransen et al. | 119/14.02 |
| 2010/0031889 A1 * | 2/2010 | Eriksson et al. | 119/14.02 |
| 2011/0308469 A1 * | 12/2011 | Vollmer et al. | 119/14.04 |
| 2012/0000427 A1 * | 1/2012 | Nilsson | 119/14.02 |
| 2012/0118237 A1 * | 5/2012 | Torgerson et al. | 119/14.18 |
| 2012/0118238 A1 * | 5/2012 | Torgerson et al. | 119/14.18 |
| 2013/0112142 A1 * | 5/2013 | Harty et al. | 119/14.02 |
| 2013/0239897 A1 * | 9/2013 | Birk et al. | 119/14.04 |

FOREIGN PATENT DOCUMENTS

| | | |
|---|---|---|
| EP | 0 689 761 A1 | 1/1996 |
| EP | 1 163 842 A2 | 12/2001 |
| EP | 1 523 879 A2 | 4/2005 |
| GB | 1 175 588 A | 12/1969 |
| GB | 1 549 131 A | 8/1979 |
| RU | 2 226 822 C2 | 4/2004 |
| RU | 2 233 079 C2 | 7/2004 |
| RU | 70 743 U1 | 2/2008 |
| SU | 1 727 730 A1 | 4/1992 |

OTHER PUBLICATIONS

International Search Report, dated Aug. 2, 2010, from corresponding PCT application.
Supplementary International Search Report, dated Jul. 7, 2011, from corresponding PCT application.

* cited by examiner

ARRANGEMENT FOR AUTOMATICALLY CLEANING TEAT CUPS OF A ROTARY MILKING PLATFORM

THE BACKGROUND OF THE INVENTION AND PRIOR ART

The present invention relates to an arrangement for automatically cleaning teat cups of a rotary milking platform, wherein the platform comprises a plurality of milking stalls provided with teat cups.

In a conventional rotary milking parlour, the cows walk on to an annular rotating platform and enter a milking stall. An operator or a milking robot located on the outside or on the inside of the annular platform, attaches teat cups to the teats of the cows. Usually, the platform rotates continuously with a constant low speed. When a milking process is finished, a removing device removes the teat cups from the cows and moves them to a parked position. The milked cows leave thereafter the milking stall and the platform.

Usually, each milking stall on a rotary milking platform is provide with a storing device which holds the teat cups in a parked position when they not are used and a cleaning device which rinses and/or cleans the parked teat cups between the milking processes on the platform. However, large rotary milking platforms of the HBR (Herringbone Rotary) type may have up to 40 milking stalls and large rotary milking platforms of the PR (Parallel Rotary) type may have up to 100 milking stalls. Thereby, the cost for the cleaning devices is relatively high.

SUMMARY OF THE INVENTION

The object of the present invention is to achieve an arrangement making it possible to clean the teat cups on a rotary milking platform in an effective manner with a relative inexpensive cleaning device.

This object is achieved by the arrangement initially defined, which is characterised in that the arrangement comprises a cleaning device arranged at the side of the platform which is adapted to clean at least the teat cups in the milking stalls. Consequently, the cleaning device is arranged beside the platform and it is not attached to any part of the platform. The cleaning device is arranged at the side of the platform in a position such that it is able to clean the teat cups in the storing devices when they arrive to a position close to the cleaning device. It is possible to clean all teat cups of a rotary milking platform by means of such a cleaning device. Thereby, the cost for such a cleaning device is considerably lower than the cost for separate cleaning devices in each milking stall on the platform.

According to an embodiment of the invention, the arrangement may comprise a storing device adapted to hold the teat cups in a storing position when they are not used. One storing device may be arranged in each milking stall. The cleaning device may be adapted to clean the teat cups in the milking stalls when the platform has reached a predetermined rotational position. Preferably, the predetermined rotational position is located in the vicinity of a rotational position in which an animal leaves the milking stall and a rotational position in which a new animal enter the milking position. In this case, the cleaning device cleans the teat cups between two milking processes in a milking stall on the rotary platform. The cleaning device may clean the teat cups during rotation of the platform or when the platform has been stopped.

According to a preferred embodiment of the invention, the cleaning device comprises at least one outlet opening through which cleaning medium is supplied to the teat cups. The outlet opening of the cleaning device may have a position at the side of the platform such that the cleaning device is able to supply cleaning medium to the teat cups when platform arrive to the predetermined rotational position. The cleaning medium may be supplied to the teat cups in the form of one or several jets from the outlet opening. The cleaning medium may be water, water with a detergent or an arbitrary kind of cleaning medium. The arrangement may comprise positioning means adapted to provide a positioning of the cleaning device and/or the teat cups to a cleaning position in which the cleaning device is able to supply cleaning medium from the outlet opening to a teat cup. Before a cleaning process is started, it is many times necessary to use any form of positioning means performing positioning movements between the cleaning device and the teat cups in order to position them in a favourable cleaning position.

According to a preferred embodiment of the invention, the cleaning device comprises a movable part provided with the outlet opening through which cleaning medium is supplied to the teat cup and wherein the positioning means is adapted to provide a positioning of the movable part of the cleaning device in relation to the teat cups n. The positioning means may be adapted to move the movable part of the cleaning device from an inactive position on the side of the platform to an active position in which it extends in over the platform towards the teat cups. By means of such a cleaning device, it is possible to move the outlet opening to a favourable cleaning position in relation to a teat cup.

According to an alternative embodiment of the invention, the storing devices comprise a movable part holding the teat cups and wherein the positioning means is adapted to provide a positioning of the movable part of the storing device in relation to the cleaning device. The positioning means may be adapted to move the movable part of the storing device from an ordinary position on the platform to a position in which it extends out from the platform towards the cleaning device. By means of such a storing device, it is possible to move the teat cups to a favourable cleaning position in relation to the cleaning device.

According to an embodiment of the invention, the positioning means comprises at least one cylinder member adapted to provide the positioning of the cleaning device and/or the teat cups to the cleaning position. Such a cylinder member may be a hydraulic cylinder, pneumatic cylinder or an electric cylinder. Preferably, the positioning means comprises a control unit adapted to control the positioning of the cleaning device and/or the teat cups to the cleaning position. Such a control unit may be a computer or the like provided with software adapted to control the positioning of the cleaning device and/or the teat cups to the cleaning position.

According to a further embodiment of the invention, the positioning means comprises guiding surfaces adapted to guide the cleaning device and/or the teat cups during the positioning to the cleaning position. The positioning of the cleaning device and/or the teat cups to the cleaning position has many times to be performed with a high precision. The use of such guiding surfaces makes it possible to perform a positioning with a high precision even if the original position of the teat cups and the cleaning device differs somewhat from time to time.

According to an embodiment of the invention, the cleaning device may be adapted to supply cleaning medium to an outer surface of teat cups. In this case, the cleaning device may supply water jets to the outer surface of the teat cup in the storing device. The cleaning device may be adapted to supply cleaning medium to an inner surface of teat cups. In this case, the cleaning device may comprise a rod member provided with at least one outlet opening for cleaning medium, wherein the positioning means is adapted to introduce the rod member to a cleaning position inside an inner space of the teat cup. Preferably the cleaning device comprises a rod member for each teat cup. The cleaning medium may be supplied to the inner surface of the teat cup through a suitable number of outlet openings. The cleaning device may be adapted to clean both the inner and outer surfaces of the teat cups.

According to an embodiment of the invention, the cleaning device may comprise a coupling member adapted to be releasable connected to a milk conduit in the milking stalls such that the cleaning device is able to supply cleaning medium into a closed milk conduit circuit comprising the teat cups and at least one connected milk conduits in the respective milking stalls. At the same time as the rod members are introduced into the teat cups, this coupling member may be connected to said milk conduit. Thereby, it is possible to create a closed circuit for the cleaning medium supplied into the teat cups. In this case, the supplied cleaning liquid flows through at least one milk conduit connected to the teat cups before it flows via said coupling member back to the cleaning device. The cleaning device may circulate the cleaning medium a predetermined period of time in the closed circuit. Thereby, the inner surfaces of the teat cups and the inner surfaces of the connected milk conduit obtain a very effective cleaning. Such a cleaning process of the teat cups and the milk conduits in a milking stall may be performed at the same time as animals are milked in other milking stalls on the platform.

According to a further embodiment of the invention, the arrangement comprises compensating means adapted to provide a motion of the cleaning device in relation to the platform, which compensates for relative motions between the cleaning device and the platform during the cleaning process of the teat cups. In this case, the cleaning device may be moved along a rail member or the like with the same speed as the platform. The compensating means may comprise a locking member adapted to lock the cleaning device and the storing device in a fixed position in relation to each other in the cleaning position. Such a locking device makes it possible for the cleaning device to be moved with the rotary platform during the cleaning process of the teat cups. Thereby, it is not necessary to stop the platform during the cleaning process.

According to an embodiment of the invention, the cleaning device may be arranged radially outside of an outer edge portion of the platform. When the animals stands in the milking stalls on the rotary platform with their back parts at an outer edge portion of the platform, it is suitable to arrange the storing devices in the vicinity of the outer edge portion of the platform. In this case, it is suitable to arrange the cleaning device radially outside of the outer edge portion of the platform such that the distance between the storing device on the rotary platform and the cleaning device at the side of the platform will be relatively small when the teat cup are to be cleaned. Alternatively, the cleaning device is arranged radially inside of an inner edge portion of the platform. When the animals stands in the milking stalls on the rotary platform with their back parts at an inner edge portion of the platform, it is suitable to arrange the storing devices in the vicinity of the inner edge portion of the platform. In this case, it is suitable to arrange the cleaning device radially inside of the inner edge portion of the platform such that the distance between the storing device on the rotary platform and the cleaning device at the side of the platform will be small when the teat cup are to be cleaned.

BRIEF DESCRIPTION OF THE DRAWINGS

The present invention is now to be explained more closely by means of preferred embodiments, which are disclosed as examples, and with reference to the attached drawings.

BRIEF DESCRIPTION OF PREFERRED
EMBODIMENTS OF THE INVENTION

Figure 1:
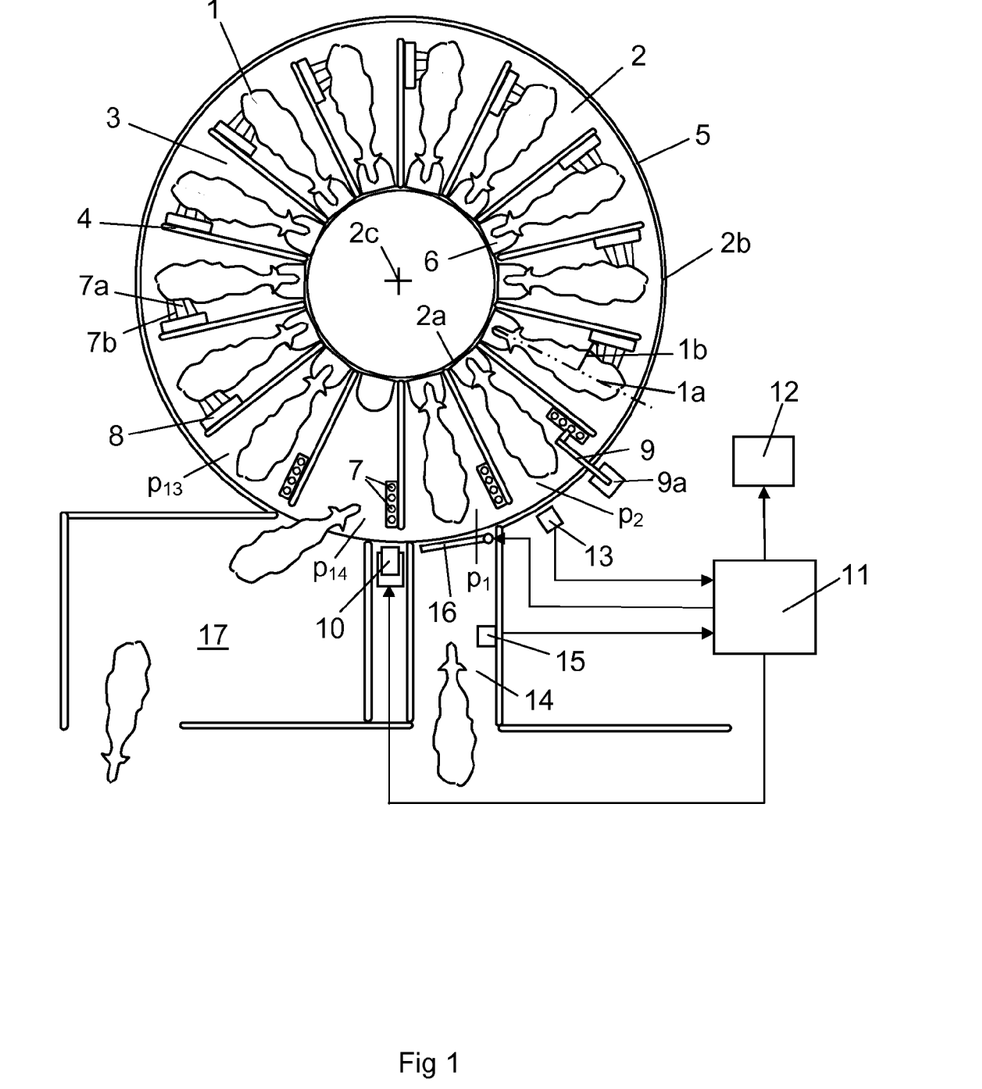
FIG. 1 shows a rotary milking platform provided with an arrangement for cleaning teat cups.

FIG. 1 shows a milking arrangement for milking of cows 1. The milking arrangement comprises a rotary annular platform 2 having an inner edge portion 2a and an outer edge portion 2b. The platform 2 rotates during operation around a vertical axis 2c. The platform 2 has an upper surface forming a support surface for the cows 1. A plurality of fence arrangements 4 are arranged on the upper surface of the platform 2. The fence arrangements 4 form milking stall 3 for receiving individual cows 1 in predetermined milking positions. In this case, the fence arrangements 4 have an essentially straight radial extension on the platform 2 between an inner end located at the vicinity of the inner edge portion 2a of the platform and an outer end located at the vicinity of the outer edge portion 2b of the platform. The fence arrangements 4 are arranged at equal intervals around the annular platform 2. An outer fence arrangement 5 is mounted around a main part of the outer periphery of the platform 2. The object of the outer fence arrangement 5 is to prevent that the cows 1 in the milking stalls 3 step backward and out of the platform 2 during a milking process.

Each milking stall 3 is provided with a feeding trough 6 arranged in the vicinity of the inner periphery 2a of the platform. Each milking stall 3 is also provided with a milking member to be attached to the teats of a cow 1 standing in the respective milking stall 3. In this case, the milking member comprises four separate teat cups 7. Each teat cup 7 is provided with a milk conduit 7a and a pulsation conduit 7b. Each milking stall 3 comprises a storing device 8 adapted to hold the teat cups 7 in a parked position when they are not in use. A base portion 9a of a robot arm 9 is arranged in a position outside the outer edge portion 2b of the platform 2. A cleaning device 10 is arranged in a position outside of the outer edge portion 2b of the platform 2.

A control unit 11 is adapted to control a schematically shown drive mechanism 12 for driving of the platform 2. The drive mechanism 12 may include a drive wheel mechanism, which is arranged in contact with a circular rail on the underside of the platform 2. A position sensor 13 is adapted to sense the rotational position of the platform 2 and to send a signal to the control unit 11 about the actual position of the platform 2. The milking arrangement comprises an entrance passage 14 to the platform 2. The entrance passage 14 is provided with a detecting sensor 15 and a movable gate 16. An exit area 17 is arranged in connection to the platform 2. The exit area 17 is entered by the cows 1 when they leave the platform 2.

If a cow 1 wanted to be milked, she walks to the entrance passage 14 leading to the rotary platform 2. The entrance passage 14 has a width such that only one cow 1 at a time can be located in a front position of the passage 14. The detection sensor 15 detects when a cow 1 arrives to the front position of the passage 14 and sends a signal to the control unit 11 with this information. In certain cases, the detection sensor 15 may be an identification sensor sensing the identity of the cow 1. The gate 16 is in a closed position when the cow 1 arrives to the front position of the entrance passage 14. The control unit 11 receives substantially continuously information from the position sensor 13 about the actual rotational position of the platform 2. When a milking stall 3 arrives to a first rotational position $p_1$, just in front of the gate 16, the control unit 11 opens the gate 16 and the cow 1 enters the platform 2.

The gate 16 is moved to its closed position as soon as the whole cow 1 is inside the milking stall 3. The feeding trough 6 attracts the cow 1 and facilitates the positioning of the cow 1 in the milking stall 3. The feeding troughs 6 may be movably arranged. By setting the feeding trough 6 in a suitable position, it is possible to adjust the position of the cow 1 in the milking stall 3 to a desired milking position. In this case, the cows 1 are arranged in milking stalls 3 on the platform 2 such that a longitudinal axis 1a of the cows forms an angle of about 90 degrees to the direction of motion 1b of the cows 1 on the platform 2. The platform 2 is of the PR (Parallel Rotary) type. The cows 1 stand here in a radial direction on the platform 2 with their heads at the inner edge portion 2a of the platform 2. In these milking positions, a back part of the cow 1 will be located at the outer edge portion 2b of the platform 2.

When the milking stall 3 with the cow 1 has rotated to a second rotational position $p_2$, the robot arm 9 is activated and it fetches the teat cups 7 from the storing device 8 and attaches them to the cow 1. The platform 2 is driven with a slow speed such that it is no problem for the robot arm 9 to compensate for the relative motions between the cow 1 on the platform 2 and the robot arm 9 during the attaching process of teat cups 7 to the cow 1. A milk meter (not shown) supervises the milk flow during the milking process. As soon as the milk flow drops below a predetermined value, a removing device (not shown) removes the teat cups 7 from the teats of the cow 1. The milking process proceeds during nearly one revolution on the platform 2. If the teat cups 7 have not been removed earlier, they are at least removed when the milking stall 3 reaches a thirteenth rotational position $p_{13}$. In the thirteenth rotational position $p_{13}$, a treatment supplying device may spray a disinfecting medium or another kind of treatment medium to the teats of the cow 1 after that the teat cups 7 have been removed. Finally, when the milking stall 3 reaches a fourteenth rotational position $p_{14}$, the cow 1 leaves the milking stall 3 and enters the exit area 17. In the fourteenth rotational position $p_{14}$, the cleaning device 10 is activated and it performs a cleaning process of the teat cups 7 in the storing device 8. Such a cleaning process will be performed after each milking process. Alternatively, it will be performed with predetermined intervals or when bad milk has been detected during the milking process. Thereafter, the milking stall 3 will again be rotated to the first rotational position $p_1$ and be ready to receive a new cow 1.

Figure 2:
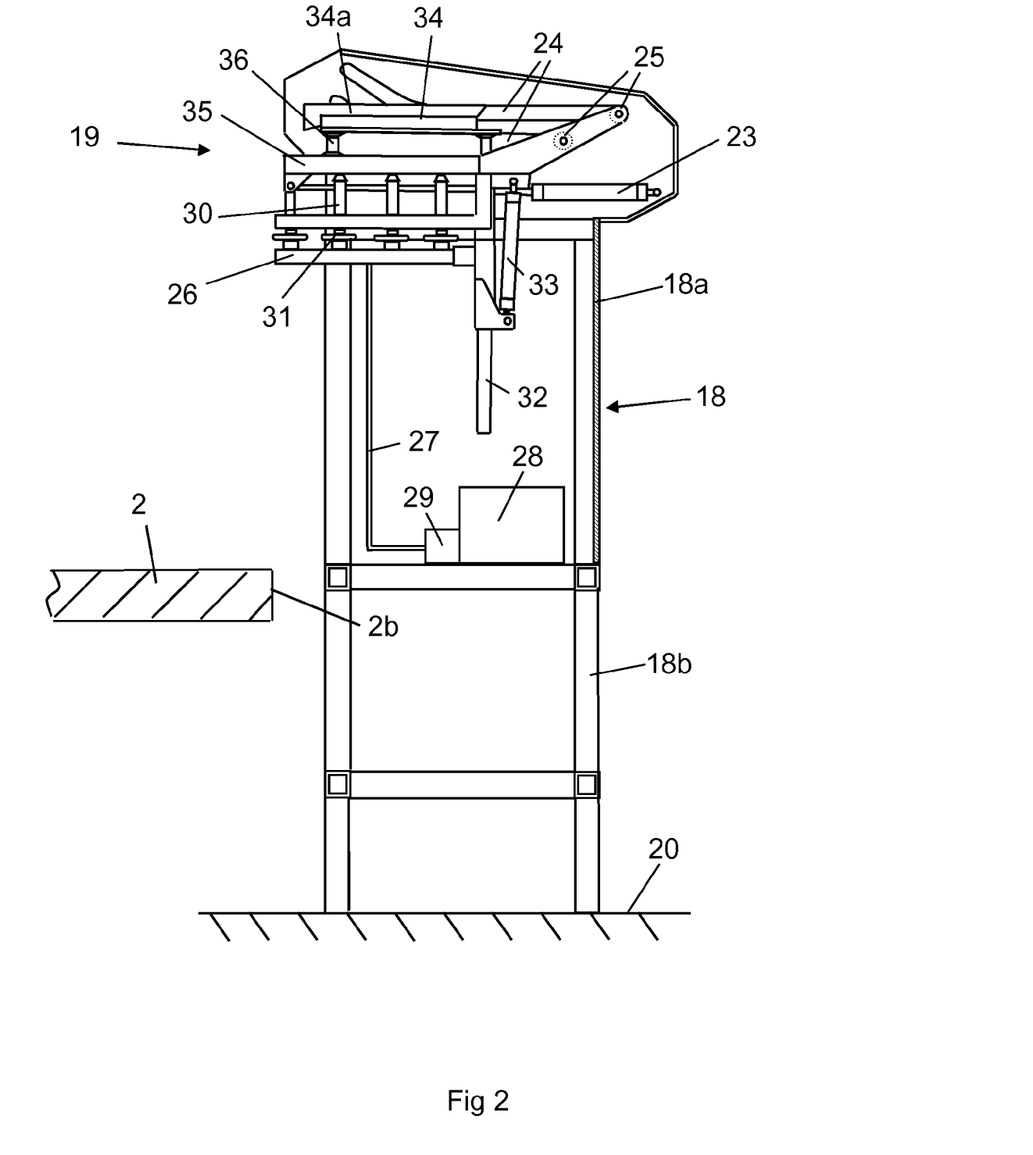
FIG. 2 shows the cleaning device in FIG. 1 in a non active position.
Figure 3:
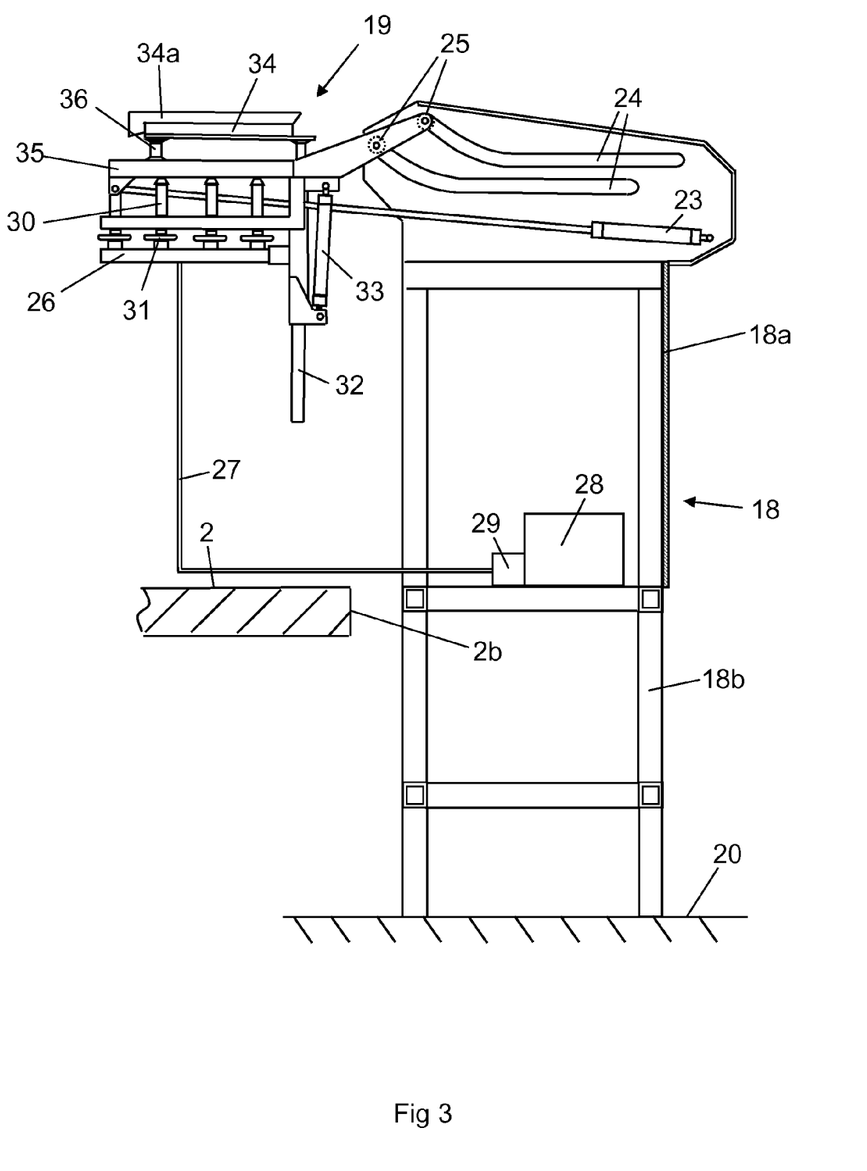
FIG. 3 shows the cleaning device in FIG. 1 in an active position.

FIGS. 2 and 3 show the cleaning device 10 more in detail. The cleaning device 10 comprises a stationary part 18 and a movable part 19. The stationary part 18 is arranged on a ground surface 20 in a position radially outside the outer edge portion 2b of the rotary platform 2. The stationary part 18 comprises a box-shaped portion 18a arranged on the top of a frame construction 18b. The movable part 19 of the cleaning device 10 is movably arranged between a folded-in position, which is shown in FIG. 2, and a folded-out position, which is shown in FIG. 3. A first cylinder member 23 is adapted to move the moveable part 19 between said positions. The box-shaped portion 18a comprises two elongated guiding paths 24 in a wall portion. Guiding members 25 of the movable part 19 is adapted to be slided or rolled along the guiding paths 24. The movable part 19 comprises a horizontal tubular member 26. The tubular member 26 is connected to a cleaning liquid tank 28 via a conduit 27. The cleaning liquid may be water, water with a detergent or any another kind of cleaning liquid. A pump 29 is adapted to pump the cleaning liquid from the cleaning liquid tank 28 to the tubular member 26.

Four vertical rod members 30 are arranged on an upper side of the tubular member 26. Each rod member 30 comprises an inner channel with a plurality of outlets opening 30a for the cleaning liquid. The rod members 30 comprise a tapered shape portion at an upper portion and a receiving member 31 at a bottom portion. The tubular member 26 comprises an end portion which is slidably connected to a vertical element 32. A second cylinder member 33 is adapted to move the tubular member 26 in a vertical direction along the vertical element 32. The vertical element 32 is connected to a substantially U-shaped upper portion 34 of the movable part 19. The upper portion 34 comprises at the top guiding plates 34a. The upper portion 34 is arranged on a frame member 35 of the movable part 19 by means of resilient members 36.

Figure 4:
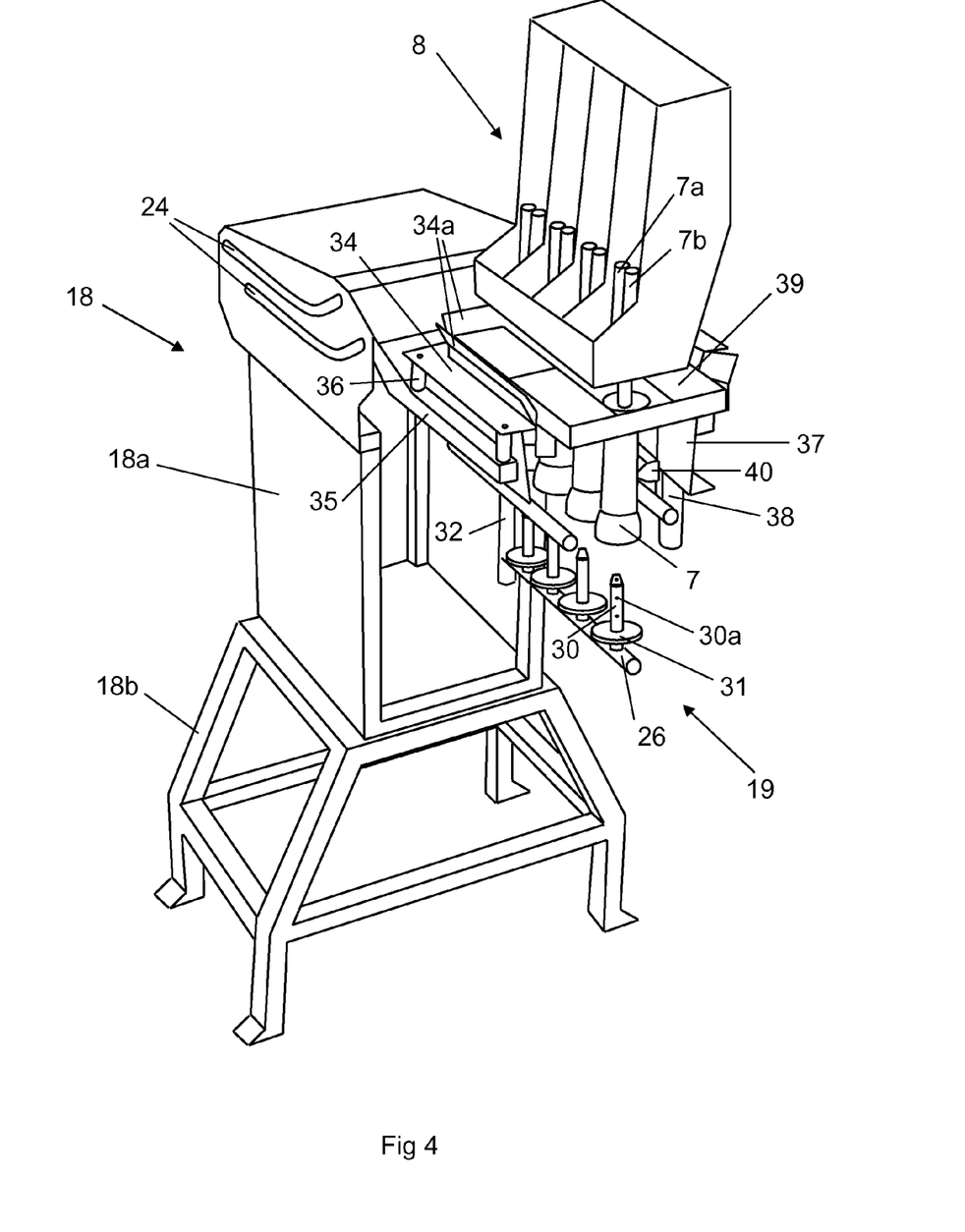
FIG. 4 shows a perspective view of the cleaning device and the storing device in FIG. 1.

FIG. 4 shows the cleaning device 10 and the storing device 8. The storing device 8 comprises a rear wall element 37 connected to a stationary member 38 in the milking stall 3. The storing device 8 comprises a parking element 39 having a lower surface forming parking surfaces for the teat cups 7. The parking surfaces are directed downwards. The ends of teat cups 7, which are connected to a milk conduit 7a and a pulsation conduit 7b, are adapted to be positioned on the parking surfaces of the parking element 39. Thus, the openings to the inner space of the teat cups 7 are directed downwardly in the parked position. Each parking surface of the parking element 39 is provided with a through hole for the milk conduit 7a and the pulsation conduit 7b of the teat cups 3. Retraction cylinders or the like, which not are shown in the figures, are arranged in a position above the storing device 8. One retraction cylinder for each teat cup 1 may be used. The retraction cylinders are adapted to provide a pulling force in the milk conduits 7a, when a milking process has been finished, such that the teat cups 7 are removed from the teats of a cow and retracted to the parking surfaces of the parking element 39. The storing device 8 comprises a positioning element 40 arranged on the rear wall element 37. The positioning element 40 may comprise recesses adapted to receive the outer convex surfaces of teat cups 7 when then they are parked in the storing device 8.

When a milking stall 3 arrives to the fourteenth rotational position $p_{14}$, the cow 1 leaves the milking stall 3. The control unit 11 determines if the teat cups 7 in the milking stall 3 have to be cleaned or not. If the teat cups 7 have to be cleaned, the control unit 11 stops the rotation of the platform 2 in a rotational position in which the storing device 8 is just in front of the cleaning device 10. In this case, the platform 2 is stopped when the milking stall 3 is in the fourteenth rotational position $p_{14}$. Thereafter, the control unit 11 activates the first cylinder member 23 such that it moves the moveable part 19 from the folded-in position, which is shown in FIG. 2, to the folded-out position, which is shown in FIGS. 3 and 4. The first cylinder member 23 moves the movable part 19 in a direction defined by the guiding paths 24. Initially, the first cylinder member 23 moves the movable part 19 in a substantially horizontally direction out over the platform 2. At the end of the motion, the guiding paths 24 move the movable part 19 in a direction obliquely upwards. During this motion obliquely upwards, the guiding plates 34a of the movable part 19 come in contact with the lower edge surfaces of the parking element 39. The upper portion 34 has a certain mobility in relation to the frame member 35 by means of the resilient members 36. It is therefore possible for the guiding plates 34a to adjust the position of the upper portion 34 of the cleaning device 10 to a desired position in relation the parking element 39 of the storing device 8. At the same time, the tubular member 26 will be moved a desired position in relation to the teat cups 7 in the storing device 8 with a high precision. FIG. 4 shows the tubular member 26 in this position. The rod members 30 on the tubular member 26 are here positioned vertically below a respective teat cup 7 in the storing device 8.

The control unit 11 activates the second cylinder member 33 such that it moves the tubular member 26 and the rod members 30 in a vertical direction upwards. The rod members 30 are moved through the openings of the teat cups 7 and into the inner space of the teat cups 7. The tapered portion at the upper portion of the rod members 30 forms guiding surfaces which facilitate the introduction of the rod members 30 into the inner spaces of the teat cups 7. The vertical motion upwards is ceased when the receiving members 31 of the rod members 30 come in contact with the teat cups 7. The rod members 30 are now in a cleaning position in relation to the teat cups 7. The control unit 11 activates the pump 29 such that cleaning liquid is pumped from the cleaning liquid tank 28, via the conduit 27 and the tubular member 26, to an inner flow channel of the rod members 30. The cleaning liquid in the inner flow channels of the rod members 30 flows out through a plurality of the outlet openings 30a. The cleaning liquid reaches a surface forming the inner space of the teat cups 7. The supplied cleaning liquid removes milk residues from the inner surface of the teat cups 7. When a predetermined quantity of cleaning liquid has been supplied to the teat cups 7, the pump 29 is stopped. The control unit 11 activates the second cylinder member 33 such that it moves the tubular member 26 and the rod members 30 downwardly. When the tubular member 26 reaches a lower end position, the first cylinder member 23 is activated. The first cylinder member 23 moves the movable part 19 back from the folded-out position to the folded-in position. As soon as the movable part is in the folded-in position, the control unit 11 activates the drive mechanism 12 and the rotary motion of the platform 2 is resumed.

Figure 5:
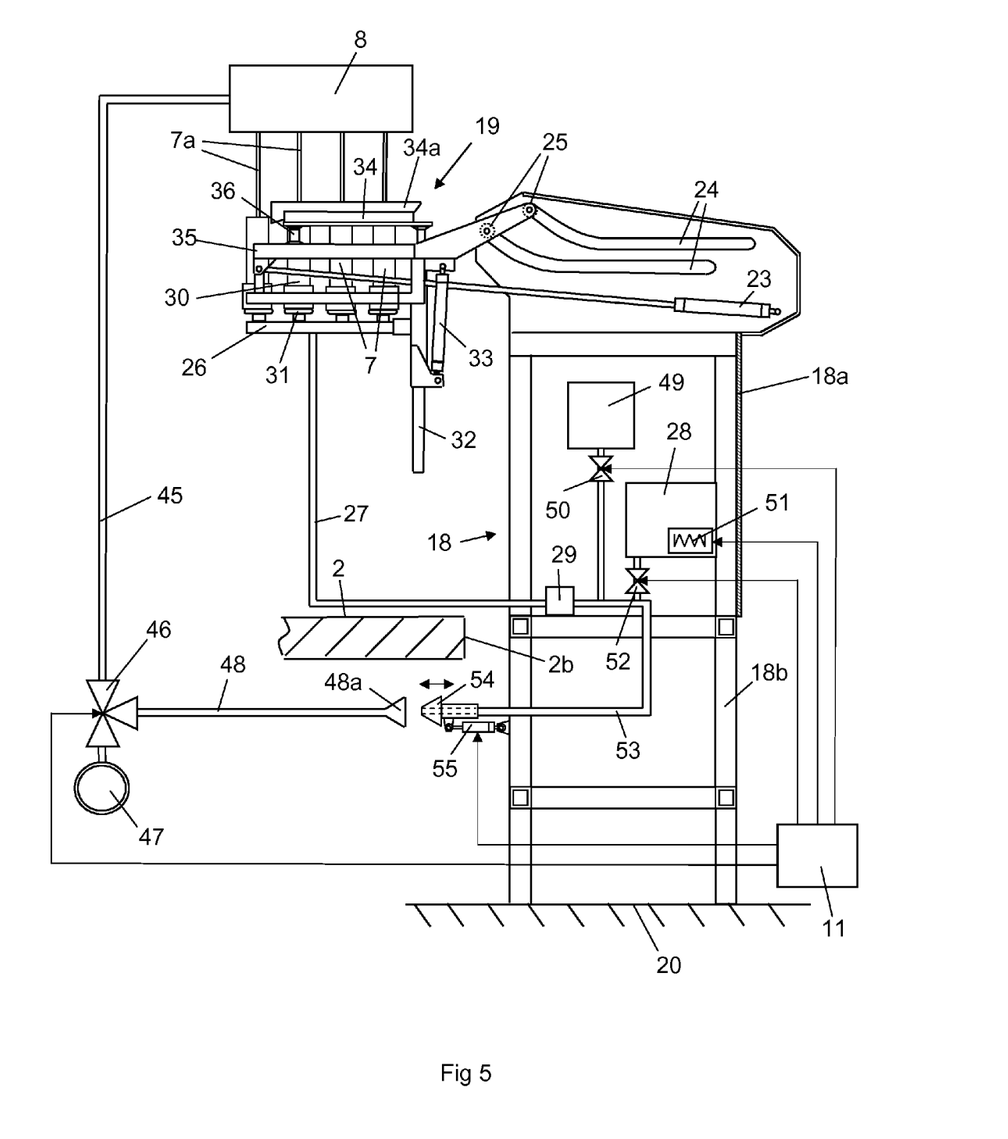
FIG. 5 shows a perspective view of a cleaning device of a second embodiment and FIG. 6 shows a rotary milking platform provided with an alternative arrangement for cleaning teat cups.

FIG. 5 shows an alternative cleaning device 10 for performing a cleaning process of the teat cups 7 and connected milking conduits in the milking stalls 3. The teat cups 7 are here arranged in a storing position in a schematically disclosed storing device 8. The milk conduits 7a of the respective teat cups 7 are connected to a common milk conduit 45. The common milk conduit 45 is adapted to convey the milk from the teat cups 7 in the milking stall 3, via a valve 46, to a common milk line 47 for all milking stalls 3 on the platform 2. The valve 46 can be set in a milking position and in a cleaning position. A return conduit 48 is connected to the valve 46. The return conduit 48 comprises a funnel shaped portion 48a at an end. The cleaning device 10 comprises a conduit 53 provided with a displaceable tubular coupling member 54. The tubular coupling member 54 has a front portion with a complementary shape to the inner surface of the funnel-shaped portion 48a of the return conduit 48. A cylinder 55 is adapted to displace the tubular coupling member 54 between a retracted position in which the tubular coupling member 54 is not connected to the funnel-shaped portion 48a and a projecting position in which it is connected to the funnel-shaped portion 48a.

In this case, the cleaning device comprises an additional tank 49 with an additional medium such as a sanitizer or a detergent. The additional medium is supplied to the conduit 27 by means of a valve 50. It is possible to perform an alternative cleaning process by supplying the additional medium from the additional tank 49 to the cleaning liquid in the conduit 27 in a desired quantity. A boiler 51 is arranged in contact with the cleaning liquid in the cleaning liquid tank 28. The object of the boiler is to heat the cleaning liquid in the tank 27 to a desired temperature. The cleaning liquid in the tank 28 is supplied to the conduit 27 by means of a valve 52. A control unit 11 is adapted to control the valves 46, 50, 52, the boiler 51 and the motion of the tubular coupling member 54 by means of the cylinder 55.

When a cleaning process has to be performed of the teat cups 7 and the milk conduits in a milking stall 3, the movable part 19 of the cleaning device 10 moves the rod members 30 into the teat cups 7. At substantially the same time, the control unit 11 activates the cylinder 55 such that it displaces the tubular coupling member 54 in engagement with the funnel-shaped portion 48a of the return conduit 48. The conical-shaped surfaces of the front portion of the tubular coupling member 54 guarantee that the tubular coupling member 54 is displaced to a correct coupling position in relation to the funnel-shaped portion 48a of the return conduit 48. The funnel shaped portion 48a and/or the front portion of the coupling member 54 may comprise a rubber material such that a good sealing is obtained between said components in the coupling position.

Furthermore, the control unit 11 sets the valve 46 in a cleaning position, activates the pump 29 and opens the valve 52 such that cleaning liquid is supplied to the conduit 27. The pump 29 conveys the cleaning liquid from the conduit 27 to the teat cups 7 via the tubular member 26 and the rod members 30. In this case, the pump 29 conveys the cleaning liquid with a pressure such that the cleaning liquid flows up through the milk conduits 7a of the respective teat cup 7. Thereafter, the cleaning liquid flows into the common milk conduit 45 and to the valve 46. Since the valve 46 is in the cleaning position it directs the cleaning liquid from the common conduit 45 into the return conduit 48. The cleaning liquid flows through the funnel-shaped portion 48a and the connected tubular coupling member 54 to the conduit 53 and back to the conduit 27. The cleaning liquid may circulate in this closed conduit circuit during a predetermined period of time. When the cleaning process is finished, the control unit 11 activates the cylinder 55 such that it displaces the tubular coupling member 54 out of engagement with the funnel-shaped portion 48 and back to the retracted position. At the same time, the movable part 19 is moved back to the folded in position. This cleaning process of the teat cups 7 and the milk conduits 7a, 27, 45, 48, 53 in the milking stall 3 may be performed at the same time as cows 1 are milked in other milking stalls on the platform 2.

Figure 6:
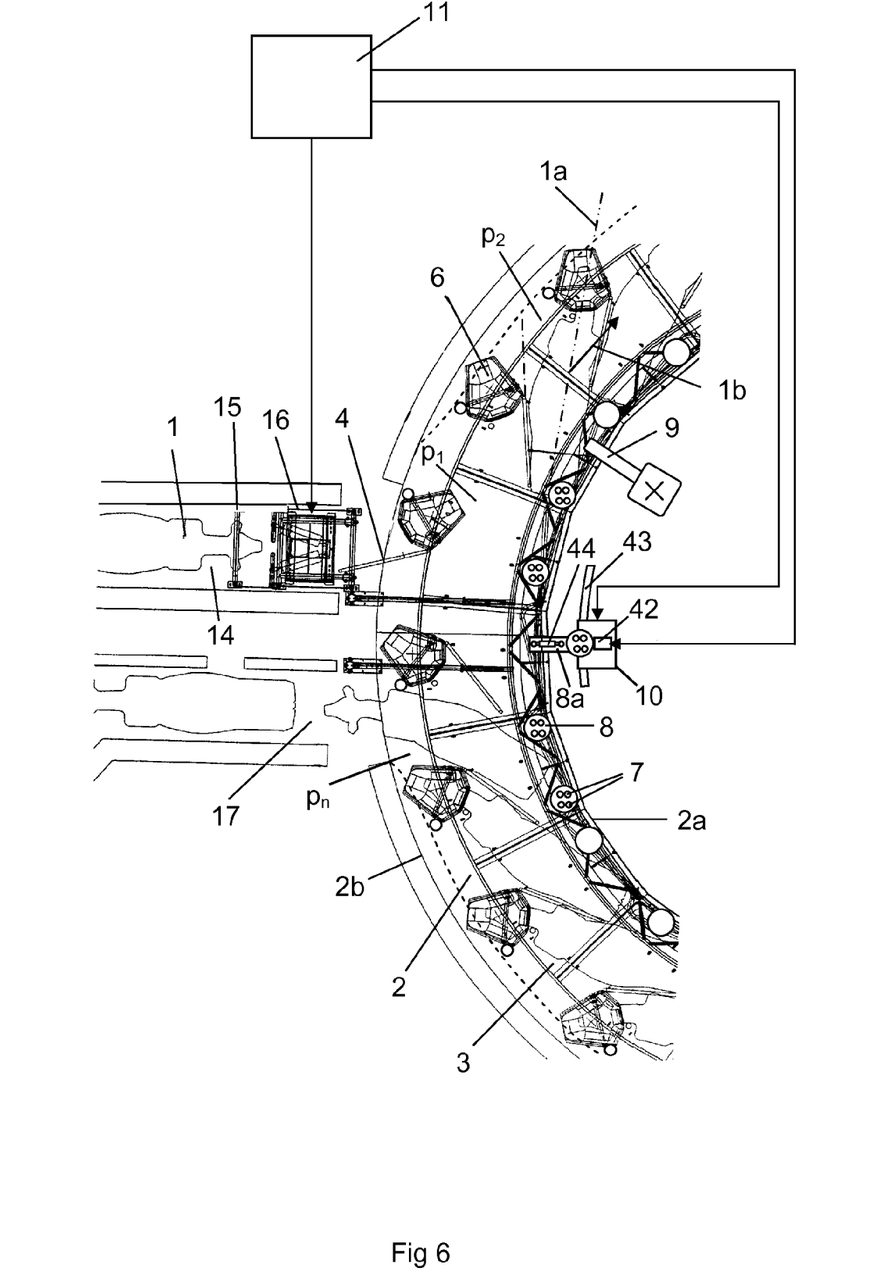

FIG. 6 shows a part of an alternative milking arrangement comprising an annular rotary platform 2. The rotary platform 2 comprises rotatable fence arrangements 4 dividing the platform 2 into milking stalls 3 for receiving individual cows 1 in predetermined milking positions. By the use of rotatable fence members 4, it is possible to position the cows 1 very close together on the platform 2. Each fence arrangement 4 carries a feeding trough 6. In this case, the cows 1 are arranged on the platform 2 such that the longitudinal axis 1a of the respective cows forms an angle to the direction of motion 1b of the cows 1 on the platform 2 which is less than 90 degrees. The platform 2 is of the HBR (Herringbone Rotary) type. The cows 1 are arranged in a herringbone pattern on the platform 2. The head of the cows 1 are here at the outer edge portion 2b of the platform 2 such that the cows 1 face outwards.

An entrance passage 14 and an exit area 17 for the cows 1 are located adjacent to each other at the outer edge portion 2b of the platform 2. A milking robot arm 9 is here arranged in a position inside the inner edge portion 2a of the platform 2. A storing device 8 for teat cups 7 are arranged in each milking stall 3 in the vicinity of the inner edge portion 2a of the platform 2. In this case, the storing device 8 comprises a movable part 8a holding the parked teat cups 7. The storing devices 8 are arranged in a space located on one side of a cow 1 in a milking position on the platform 2 and behind a cow 1 standing in an adjacent milking position. When the cows 1 are arranged in a herringbone pattern on a platform 2, the above-mentioned space is normally empty. Therefore, it is suitable to use this space for the storing device 8. In this case, a cleaning device 10 is arranged in a position inside the inner edge portion 2a of the platform 2. The cows 1 leave the milking stalls 3 when they are in a last rotational position $p_n$ on the platform 2. The cleaning device 10 is positioned substantially radially inside of the milking stalls 3 when they are in the last rotational position $p_n$. A schematically disclosed locking member 42 is adapted to releasably lock together the movable part 8a of the storing device 8 and the cleaning device 10 during a cleaning process of the teat cups 7. Thereby, the cleaning device 10 is movable arranged along a rail member 43 during the cleaning process. Alternatively, the cleaning device 10 may be independently driven along the rail member 43 during the cleaning process without any locking member 42. In this case, compensating means is used providing the movable cleaning device 10 with a corresponding motion as the teat cups 7 on the platform 2.

During operation of the milking platform 2, the cows 1 walks to the entrance passage 14. The cows 1 enter a milking stall 3 on the platform 2 when it is in a first rotational position $p_1$. The milking robot 9 attaches the teat cups 7 to the cows 1 when the milking stall 3 is in a second rotational position $p_2$. The teat cups 7 are removed from the cow when the milking process has been finished. The cows 1 leave the platform 2 when the milking stall 3 arrives to the last rotational position $p_n$. The control unit 11 determines if the teat cups 7 in the milking stall 3 have to be cleaned or not. If the teat cups 7 have to be cleaned, the control unit 11 activates a cylinder member 44 which moves the moveable part 8a of the storing device 8 from a ordinary position, in which it holds the teat cups 7 above the platform 2, to a cleaning position in which it holds the teat cups 7 in a position located radially inside of the platform 2. The movable part 8a may comprise a pivotable or slidable arm or the like. The movable part 8a moves the teat cups 7 to a cleaning position 2 close to the cleaning device 10. As soon as the teat cups 7 have been moved to the cleaning position, the control unit 11 activates the locking device 42. The locking member 42 locks the movable part 8a of the storing device 8 in a fixed position in relation to the cleaning device 10. Thereafter, the control unit 11 activates the cleaning device 10 such that cleaning liquid is supplied from the cleaning device 10 to teat cups 7. The cleaning liquid may be supplied to an inner surface of the teat cups 7 and/or an outer surface of the teat cups 7. The locking member 42 transmits the rotary motion from the platform 2, via the movable part 8a of the storing device 8, to the cleaning device 10. Thereby, the cleaning device 10 is moved with the platform 2 along the rail member 43 during the cleaning process of the teat cups 7. In this case, it is not necessary to stop the rotary motion of the platform 2 during the cleaning process of the teat cups 7.

When a predetermined quantity of cleaning liquid has been supplied to the teat cups 7, the control unit 11 stops the liquid supply to the teat cups 7. The locking member 42 releases the movable part 8a of the storing device 8 from the cleaning device 10. The control unit 11 activates the cylinder member 44 which moves the movable part 8a of the storing device 8 back to its ordinary position on the platform 2. In this case, four clean teat cups are parked in the storing device 8 when the milking stall 3 arrives to the first rotational position $p_1$ on the platform 2. The cleaning device 10 is moved back to an initial position on the rail member 43 before a following milking stall 3 arrives to the last rotational position $p_n$ on the platform 2. The cleaning device 10 cleans the teat cups 7 in the storing devices 8 when the platform 2 is in a predetermined rotational position. The predetermined rotational position is located between the last rotational position $p_n$ in which a cow 1 leave the milking position and the first rotational position $p_1$ in which a new cow 1 enter the milking stall 3.

The invention is not restricted to the described embodiment but may be varied freely within the scope of the claims. The cleaning device and the storing device may have a substantially arbitrary but functional design.

The invention claimed is:

1. An arrangement for automatically cleaning teat cups (7) of a rotary milking platform (2) having plural milking stalls (3) provided with teat cups (7), the arrangement comprising:
   a control unit (11);
   a teat cups storing device (8, 8a) for holding teat cups (7) of a milking stall (3) in a first storing position with the teat cups (7) available for use in milking an animal (1) in the milking stall (3);
   a cleaning device located at a side of the platform (2) and provided with a fluid outlet opening (30a),
   the cleaning device (10) adapted to clean at least one of the teat cups (7) of the milking stall (3) when the platform (2) has reached a predetermined rotational position, under control of the control unit (11) and in a second cleaning position with the teat cups storing device (8, 8a) positioned in a cleaning relationship to the cleaning device (10) in which the cleaning device (10) is able to supply a cleaning medium from the outlet opening (30a) to the one teat cup (7); and
   a positioning unit arranged to, under control of the control unit (11), move one of the cleaning device (10) and teat cups storing device (8, 8a) so that the cleaning device (10) and teat cups storing device (8, 8a) are in the second cleaning position for cleaning the teat cups.

2. The arrangement of claim 1, wherein,
   the cleaning device (10) comprising a movable part (19) provided with the fluid outlet opening (30a); and
   wherein the positioning unit is adapted to provide a positioning of the movable part (19) of the cleaning device (10) in relation to the teat cups (7) from an inactive position on the side of the platform to an active position in which the movable part (19) extends in over the platform towards the teat cups to the second cleaning position.

3. The arrangement according to claim 2, further wherein the teat cups storing device (8) is arranged in one of the group consisting of i) at a radially outer edge portion (2b) of the platform (2) and ii) at a radially inner portion (2a) of the platform (2).

4. The arrangement according to claim 2, wherein the positioning unit comprises a cylinder member (23, 33) arranged to provide the positioning of the cleaning device (10) to the cleaning position.

5. The arrangement according to claim 4, wherein the positioning unit comprises guiding surfaces (34) adapted to guide the cleaning device (10) during the positioning to the cleaning position.

6. The arrangement according to claim 1, wherein the cleaning device (10) is arranged to supply the cleaning medium to an outer surface of the one teat cup (7).

7. The arrangement according to claim 1, wherein the cleaning device (10) is arranged to supply the cleaning medium to an inner surface of the one teat cup (7).

8. The arrangement according to claim 7, wherein,
the cleaning device further comprises a rod member (30) having an inner channel, the outlet opening (30a) located at an end of the rod member (30), and
the positioning unit is adapted to position the rod member (30) in the cleaning position inside an inner space of the one teat cup (7).

9. The arrangement according to claim 6,
the cleaning device (10) further comprising a coupling member arranged to be releasable connected to a milk conduit (48) in the milking stalls (3) such that the cleaning device (10) is able to supply the cleaning medium into a closed milk conduit circuit comprising the teat cups (7) and a connected milk conduit (7a, 45, 48) in the respective milking stalls (3).

10. The arrangement according to claim 2, wherein the cleaning device (10) is arranged as one of the group consisting of i) at a radially outer edge portion (2b) of the platform (2) and ii) at a radially inner portion (2a) of the platform (2).

11. The arrangement according to claim 2, wherein,
the cleaning device (10) comprising a stationary part (18),
the movable part (19) is provided with plural of said outlet opening (30a),
the movable part (19) is movable, by the positioning unit, in relation to the teat cups (7) between the inactive position on the outer side of the platform and the active position with the movable part (19) extending in over the platform towards the teat cups in a cleaning position with a milking stall (3), and
the cleaning device (10) is adapted to clean, when in the cleaning position, the teat cups (7) in the milking stall (3) with a cleaning fluid supplied to each teat cup (7) through a respective one of the outlet openings (30a).

12. The arrangement according to claim 11, wherein,
the movable part (19) further comprises i) a horizontal tubular member (26) with a connection for connecting to a cleaning liquid tank, and ii) vertical members (30) arranged on an upper side of the tubular member (26), each of the vertical members (30) comprising an inner channel terminating with one of the outlet openings (30a), and
the cleaning fluid is supplied to the teat cups (7) through tubular member (26), the vertical members, and the outlet openings (30a).

13. The arrangement according to claim 12, wherein,
the movable part (19) further comprises a guiding member (25) arranged to move along a guiding path (24) of the positioning unit when moving between the active position and the inactive position,
the positioning unit comprises i) a cylinder member (23, 33) arranged to provide the positioning of the cleaning device (10) to the cleaning position, and ii) a control unit (11) adapted to control the positioning of the cleaning device (10) to the cleaning position, and
the cleaning device (10) is arranged to supply the cleaning medium to one of i) an outer surface of the teat cups (7) and ii) an inner surface of the teat cups (7).

14. The arrangement according to claim 12, wherein,
the positioning unit is adapted to position the outlet openings (30a) of the rod member (30), in the cleaning position, inside an inner space of the teat cups (7) so that the cleaning device (10) supplies the cleaning medium to an inner surface of the teat cups (7).

15. The arrangement according to claim 11, wherein, in the inactive position, the movable part (19) is located radially outside of the outer edge portion (2b) of the platform (2).

16. The arrangement of claim 1, wherein,
the teat cups storing device (8) comprises a movable part (8a) for holding the teat cups (7); and
the positioning unit (44) is operatively connected to the movable part (8a),
the positioning part is controlled by the control unit to move the moveable part (8a) from i) an ordinary position with the movable part (8a) holding the teat cups (7) above the platform (2) available for use in milking an animal (1) in the milking stall (3), to ii) the second cleaning position with the movable part (8a) holding the teat cups (7) available to the cleaning device for cleaning the teat cups.

17. The arrangement according to claim 16, further comprising:
a compensating unit (43) adapted to provide a motion of the cleaning device (10) in relation to the platform, which motion compensates for relative motions between the cleaning device (10) and the platform (2) during the cleaning process of the teat cups (7).

18. The arrangement according to claim 17, wherein the compensating unit comprises a locking member (42) adapted to lock the cleaning device (10) and the storing device (8) in a fixed position in relation to each other in the cleaning position during the cleaning process.

19. The arrangement according to claim 16, wherein,
the platform (2) is annular,
the cleaning device (10) is arranged radially inside of an inner edge portion (2a) of the platform (2),
the teat cups storing device (8) is arranged in each milking stall (3) in a vicinity of the inner edge portion (2a) of the platform (2), and
the cleaning position is located radially inside of the platform (2).

20. The arrangement according to claim 18, wherein,
the positioning unit comprises a cylinder member (44) which moves the moveable part (8a) of the storing device (8) from the ordinary position to the cleaning position,
the movable part (8a) comprises one of a pivotable arm and a slidable arm.

\* \* \* \* \*